(12) United States Patent
Kim

(10) Patent No.: US 12,107,517 B2
(45) Date of Patent: Oct. 1, 2024

(54) IMPORTANCE OF ARCHITECTURAL ASYMMETRY FOR IMPROVED TRIBOELECTRIC NANOGENERATORS WITH 3D SPACER FABRICS

(71) Applicant: University of Seoul Industry Cooperation Foundation, Seoul (KR)

(72) Inventor: Hyeok Kim, Seoul (KR)

(73) Assignee: University of Seoul Industry Cooperation Foundation, Seoul (KR)

( * ) Notice: Subject to any disclaimer, the term of this patent is extended or adjusted under 35 U.S.C. 154(b) by 112 days.

(21) Appl. No.: 18/092,155

(22) Filed: Dec. 30, 2022

(65) Prior Publication Data
US 2023/0216433 A1 Jul. 6, 2023

(51) Int. Cl.
H02N 1/04 (2006.01)
(52) U.S. Cl.
CPC ..................... *H02N 1/04* (2013.01)
(58) Field of Classification Search
CPC ........... H02N 1/04; D03D 25/005; H01B 1/12
USPC .......................................................... 310/310
See application file for complete search history.

(56) References Cited

U.S. PATENT DOCUMENTS

| 10,270,369 | B2 * | 4/2019 | Sugawara | H10N 30/30 |
| 11,658,586 | B2 * | 5/2023 | Xiong | C08B 3/10 |
| | | | | 442/59 |
| 2015/0061460 | A1 * | 3/2015 | Bae | H02N 1/04 |
| | | | | 977/948 |
| 2016/0036351 | A1 * | 2/2016 | Kim | H02N 1/04 |
| | | | | 73/514.32 |
| 2018/0006582 | A1 * | 1/2018 | Kim | H02N 1/04 |
| 2019/0356243 | A1 * | 11/2019 | Zhi | B32B 5/06 |
| 2020/0106371 | A1 * | 4/2020 | Xiong | C08B 3/10 |
| 2021/0380821 | A1 * | 12/2021 | He | A61B 5/112 |
| 2022/0239236 | A1 * | 7/2022 | Swisher | H05K 1/038 |
| 2023/0208323 | A1 * | 6/2023 | Kim | H02N 2/18 |
| | | | | 310/310 |

(Continued)

FOREIGN PATENT DOCUMENTS

| KR | 20210036183 A | 4/2021 |
| WO | 2020236895 A1 | 11/2020 |

OTHER PUBLICATIONS

Improved Output Voltage of a Nanogenerator with 3D Fabric; Hyeok Kim et al. (Year: 2020).*

(Continued)

*Primary Examiner* — Ahmed Elnakib
(74) *Attorney, Agent, or Firm* — NKL Law; Jae Youn Kim

(57) ABSTRACT

The importance of architectural asymmetry is investigated to improve the output voltage of TENGs with polyester/spandex blend three-dimensional (3D) spacer fabrics. Different types of TENGs are fabricated by stacking the 3D spacer fabrics, polydimethylsiloxane (PDMS) films, and electrodes with different stack configurations. The 3D spacer fabric TENGs fabricated with higher architectural asymmetry show higher output voltages than those fabricated with lower architectural asymmetry. In particular, the TENG with the PDMS/fabric/fabric configuration shows the highest peak-to-peak output voltage among all types. An increase in the TENG output voltage is attributed to the relatively high architectural asymmetry in the device configuration and the relatively high effective density of triboelectric charge.

3 Claims, 7 Drawing Sheets

(56) References Cited

U.S. PATENT DOCUMENTS

2023/0216433 A1* 7/2023 Kim .................. H02N 1/04 310/310
2024/0080975 A1* 3/2024 Wicaksono .............. D06C 7/04

OTHER PUBLICATIONS

Wearable All-Fabric-Based Triboelectric Generator for Water Energy Harvesting; Jiaqing Xiong et al (Year: 2017).*

Premkumar Vincenta, et al., Indoor-type photovoltaics with organic solar cells through optimal design, Dyes and Pigments, vol. 159, 2018, pp. 306-313, https://www.sciencedirect.com/science/article/pii/S0143720818306727.

Cheng Chen, et al., A high density piezoelectric energy harvesting device from highway traffic—Design analysis and laboratory validation, Applied Energy, vol. 269, 2020, 115073, ISSN 0306-2619, https://doi.org/10.1016/j.apenergy.2020.115073.(https://www.sciencedirect.com/science/article/pii/S0306261920305857).

Satish Kumar, et al., Multienvironmental evaluation of wheat (*Triticum aestivum* L.) germplasm identifies donors with multiple fungal disease resistance, Published online: Feb. 12, 2019, Springer Nature B.V. 2019.

Yongjia Wu, Haifeng Zhang, Lei Zuo, Thermoelectric energy harvesting for the gas turbine sensing and monitoring system, Energy Conversion and Management, vol. 157, 2018, pp. 215-223, ISSN 0196-8904, https://doi.org/10.1016/j.enconman.2017.12.009. (https://www.sciencedirect.com/science/article/pii/80196890417311603).

Myeong-Lok Seol, Jin-Woo Han, Dong-Il Moon, M. Meyyappan, Hysteretic behavior of contact force response in triboelectric nanogenerator, Nano Energy, vol. 32, 2017, pp. 408-413, https://doi.org/10.1016/j.nanoen.2016.12.055. (https://www.sciencedirect.com/science/article/pii/S221128551630619X).

Renyun Zhang, et al., Cellulose-Based Fully Green Triboelectric Nanogenerators with Output Power Density of 300 W m-2, Advanced Materials, Adv. Mater. 2020, 32, 2002824.

Yaojie Han, et al., Fish Gelatin Based Triboelectric Nanogenerator for Harvesting Biomechanical Energy and Self-Powered Sensing of Human Physiological Signals, ACS Appl. Mater. Interfaces 2020, 12, 14, 16442-16450, Publication Date:Mar. 16, 2020, https://doi.org/10.1021/acsami.0c01061.

Kai Dong, et al., Fiber/Fabric-Based Piezoelectric and Triboelectric Nanogenerators for Flexible/Stretchable and Wearable Electronics and Artificial Intelligence, Advanced Matter, Adv. Mater. 2020, 32, 1902549.

Jiaqing Xiong, et al., Wearable All-Fabric-Based Triboelectric Generator for Water Energy Harvesting, Advanced Energy Materials, Adv. Energy Mater. 2017, 7, 1701243.

Tao Huang, et al., Fabric texture design for boosting the performance of a knitted washable textile triboelectric nanogenerator as wearable power, Nano Energy, vol. 58,2019,pp. 375-383,ISSN 2211-2855, https://www.sciencedirect.com/science/article/pii/S2211285519300473.

Minshen Zhu, et al., 3D spacer fabric based multifunctional triboelectric nanogenerator with great feasibility for mechanized large-scale production, Nano Energy, vol. 27, 2016, pp. 439-446, ISSN 2211-2855, https://www.sciencedirect.com/science/article/pii/S2211285516302567.

Youfan Hu, et al.,Progress in textile-based triboelectric nanogenerators for smart fabrics, Nano Energy, vol. 56, 2019, pp. 16-24, ISSN 2211-2855, https://www.sciencedirect.com/science/article/pii/S2211285518308371.

Kim, Do-Kyung, et al., Improved Output Voltage of a Nanogenerator with 3D Fabric, Journal of Nanoscience and Nanotechnology, 2020, vol. 20, No. 8.

Jong Hyuk Bae, et al., Nano- and Microfiber-Based Fully Fabric Triboelectric Nanogenerator for Wearable Devices, Polymers 2020, 12, 658; doi:10.3390/polym12030658.

Jaebum Jeong, et al., Comparative Study of Triboelectric Nanogenerators with Differently Woven Cotton Textiles for Wearable Electronics, Polymers 2019, 11, 1443; doi:10.3390/polym11091443.

Kai Dong, et al., Fiber/Fabric-Based Piezoelectric and Triboelectric Nanogenerators for Flexible/Stretchable and Wearable Electronics and Artificial Intelligence, Advanced Sichen News, Jul. 26, 2019, total pp. 43.

* cited by examiner

IMPORTANCE OF ARCHITECTURAL ASYMMETRY FOR IMPROVED TRIBOELECTRIC NANOGENERATORS WITH 3D SPACER FABRICS

BACKGROUND

1. Field of the Invention

The present invention relates to a triboelectric nanogenerator (TENG). More specifically, the present invention relates to a TENG including a three-dimensional (3D) spacer fabric.

2. Discussion of Related Art

Energy harvesting is attracting attention as a special concept of an environment-friendly technology harnessing environmental energy sources. Energy harvesting requires a device for converting surrounding energy into a usable form of energy such as electrical energy. Among various types of energy harvesters, a triboelectric nanogenerator (TENG) is attracting great attention due to its excellent energy conversion efficiency and applicability to self-powered sensor systems. In particular, fabric-based TENGs are highly compatible with the human body and skin in terms of flexibility, stretchability, and texture. Also, fabric-based TENGs have excellent potential due to dense internal fiber-to-fiber mechanical interaction. Therefore, fabric-based TENGs can be seen as the most promising candidate for wearable electronic products.

Various types of fabrics, such as standard two-dimensional (2D) fabrics, three-dimensional (3D) fabrics, and 3D spacer fabrics, may be used in a TENG activation layer. It is worth noting that 3D spacer fabrics offer a better option for TENG performance than standard woven fabrics. In a previous study, a 3D spacer fabric TENG showed a peak-to-peak output voltage $V_{o,p-p}$ of about 240 V. On the other hand, a standard 2D fabric TENG only generates about 35 V. Nevertheless, it is necessary to maximize the performance of 3D spacer fabric TENGs through multidimensional engineering methods and approaches.

SUMMARY OF THE INVENTION

The present invention is directed to providing a fabric-based triboelectric nanogenerator (TENG) with improved electrical performance.

According to an aspect of the present invention, there is provided a fabric-based TENG that includes a three-dimensional (3D) spacer fabric and a polydimethylsiloxane (PDMS) layer and shows improved electrical performance through an increase in architectural asymmetry.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1A:
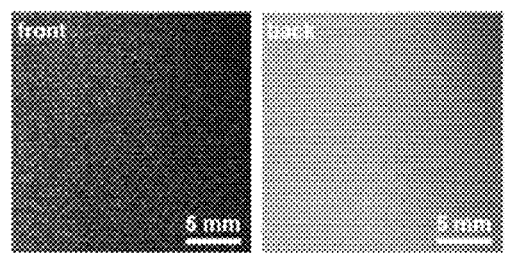
FIGS. 1(a)-1(c) are a set of diagrams illustrating a structure of a triboelectric nanogenerator (TENG) fabricated by stacking a three-dimensional (3D) spacer fabric, a polydimethylsiloxane (PDMS) film, and top and bottom electrodes according to the present invention.

Terminology used in the present specification will be briefly described first, and then exemplary embodiments of the present invention will be described in detail. As terms used herein, general terms currently used as widely as possible will be selected in consideration of functionality in the present invention, but may vary depending on the intent of those of ordinary skill in the art, precedents, the advent of new technology, etc. In particular, a term may be arbitrarily selected by the applicant. In this case, the meaning of the term will be explained in detail through the relevant descriptions. Therefore, the terms used herein should be defined on the basis of their meanings and the overall content of the present invention rather than their names.

Hereinafter, exemplary embodiments of the present invention will be described in detail with reference to the accompanying drawings.

Energy harvesting is attracting attention as a special concept of an environment-friendly technology harnessing environmental energy sources. Energy harvesting requires a device for converting surrounding energy into a usable form of energy such as electrical energy. Among various types of energy harvesters, a triboelectric nanogenerator (TENG) is attracting great attention due to its excellent energy conversion efficiency and applicability to self-powered sensor systems. In particular, fabric-based TENGs are highly compatible with the human body and skin in terms of flexibility, elasticity, and texture. Also, fabric-based TENGs have excellent potential due to dense internal fiber-to-fiber mechanical interaction. Therefore, fabric-based TENGs can be seen as the most promising candidate for wearable electronic products.

Various types of fabrics, such as standard two-dimensional (2D) fabrics, three-dimensional (3D) fabrics, and 3D spacer fabrics, may be used in a TENG activation layer. It is worth noting that 3D spacer fabrics offer a better option for TENG performance than standard woven fabrics. In a previous study, a 3D spacer fabric TENG showed a peak-to-peak output voltage $V_{o,p-p}$ of about 240 V. On the other hand, a standard 2D fabric TENG only generates about 35 V. Nevertheless, it is necessary to maximize the performance of 3D spacer fabric TENGs through multidimensional engineering methods and approaches.

The compositional heterogeneity of constituent materials is widely known to be a critical factor for fabricating high-performance TENGs. Also, modifying the architectural asymmetry of the device configuration may be an important consideration for improving the performance of 3D spacer fabric TENGs because TENGs basically utilize the unbalanced spatial distribution of triboelectric charge. However, the importance of asymmetric architectures for 3D spacer fabric TENGs is not yet fully understood.

In the present invention, the importance of architectural asymmetry in a device configuration was investigated to increase output voltages $V_o$ of 3D spacer fabric TENGs. The surface and cross-section morphologies of the 3D spacer fabric were examined using a scanning electron microscope (SEM). Also, the 3D spacer fabric was observed using a transmitted-light microscope to understand its basic structure more comprehensively. Three types of 3D spacer fabric TENGs were fabricated by varying the configuration of constituent layers. After that, the output voltages $V_o$ of the 3D spacer fabric TENGs were characterized and compared. Various performance levels of the TENGs were examined from the architectural point of view.

TENGs based on 3D spacer fabrics were fabricated in a sandwich stack configuration. FIG. 1(a) shows the front and back sheet surfaces of the 3D spacer fabric. The 3D spacer fabric was purchased from PAKA INTERTEX Co., Ltd. (Seoul, South Korea). The front and back sheets of the 3D spacer fabric had a knitted structure with loops, that is, single jersey. 3D spacers were interposed between the front and back sheets. Also, the 3D spacer fabric contained 92% polyester and 8% spandex. Polydimethylsiloxane (PDMS) films were prepared using Sylgard-184, an elastomeric PDMS kit from Dow Corning Corporation (Midland, MI, USA). A 10:1 PDMS base and curing agent mixture was stored in a vacuum environment to remove air bubbles and then poured onto a flat plate. Subsequently, the poured mixture was baked at 100° C. for one hour on a hot plate.

The mechanical elasticity of PDMS, a well-known elastomer, matches well with the polyester/spandex blend fabric.

Also, copper tapes were used as electrodes (a top electrode and a bottom electrode). The thicknesses of the 3D spacer fabric, a PDMS film, and the copper electrode were 1.68 mm, 1 mm, and 50 μm, respectively.

Figure 1B:
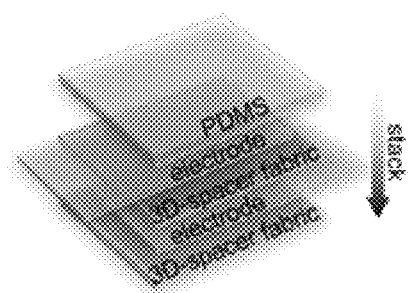
Figure 1C:
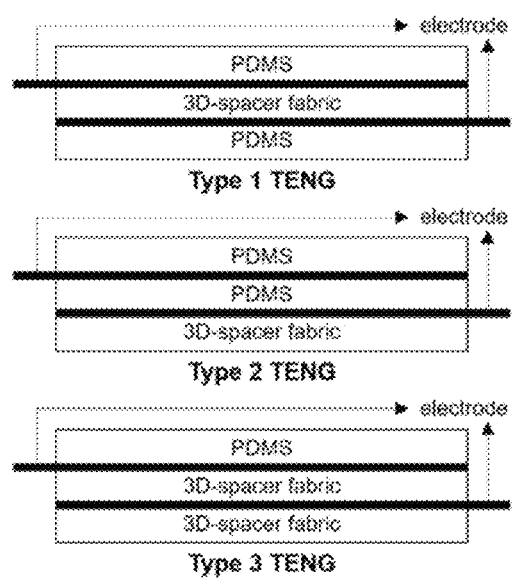

As shown in FIG. 1(b), 3D spacer fabrics, a PDMS film, and the copper tape electrodes were stacked to fabricate a TENG. Specifically, three types of TENGs (indicated by Types 1 to 3) were fabricated by varying the configuration of constituent layers as shown in FIG. 1(c).

The TENG dimensions were 8 cm×8 cm. Unlike a Type 1 TENG in which the fabric layer was interposed between PDMS films (i.e., PDMS/fabric/PDMS), Type 2 (PDMS/PDMS/fabric) and Type 3 (PDMS/fabric/fabric) TENGs were designed to have higher architectural asymmetry in the stack configurations. Moreover, the bottom electrode was in contact with a single fabric layer in the Type 1 and Type 2 TENGs, whereas the bottom electrode was interposed between the top and bottom fabric layers in the Type 3 TENG. The output voltages $V_o$ of the TENGs were measured under repetitive pressure application and release using a low-noise current preamplifier (SR570; Stanford Research Systems Inc., Sunnyvale, CA, USA) at room temperature (296 K) and a relative humidity (RH) of 29%. The applied pressure for the measurements was 0.156 N/cm².

Figure 2A:
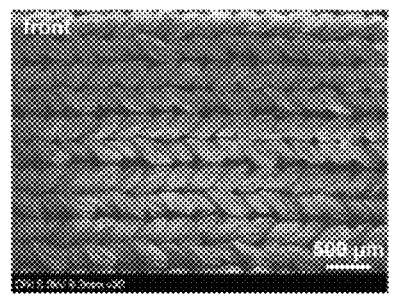
FIGS. 2(a)-2(e) are a set of scanning electron microscopy (SEM) images of a surface, a cross-section, and a fiber of a 3D spacer fabric.
Figure 2B:
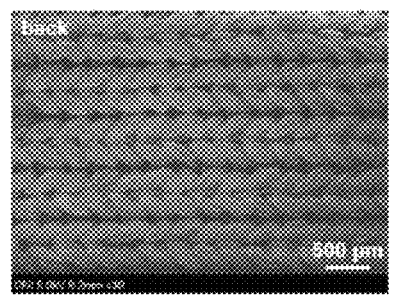
Figure 2C:
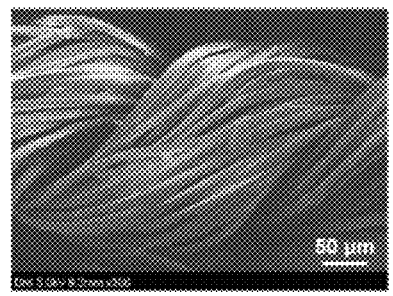

FIGS. 2A and 2B show SEM images of the front and back sheets of the 3D spacer fabric. Basically, the front and back surfaces have intertwined yarns of the single-jersey weave structure, but there is a difference in morphology between the front and back surfaces. As shown in FIG. 2(b), the back surface had a higher density of 3D spacer loops than the front surface. In other words, the 3D spacer fabric has an asymmetric morphology, which may induce an unbalanced spatial distribution of triboelectric charge. FIG. 2(c) shows a surface SEM image of a constituent yarn, which is a single strand of fibers. The numerous fibers of the 3D spacer fabric may mechanically interact with each other under externally applied compression.

Figure 2D:
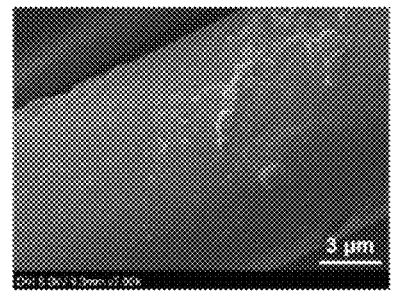

FIG. 2(d) shows a surface SEM image of a single fiber. The observed fiber shows an uneven and bumpy surface, which may be a desirable morphology in TENG designs.

Figure 2E:
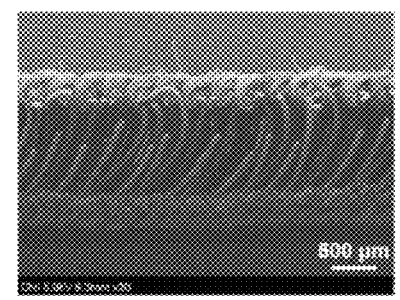

Also, FIG. 2(e) shows a cross-sectional SEM image of the 3D spacer fabric. The cross-section of the fabric shows 3D spacer fibers that are vertically laid and tilted between the front and back sheets. The 3D spacer fibers which have an elongated cylindrical structure are intertwined with the yarns of the front and back sheets.

Figure 3A:
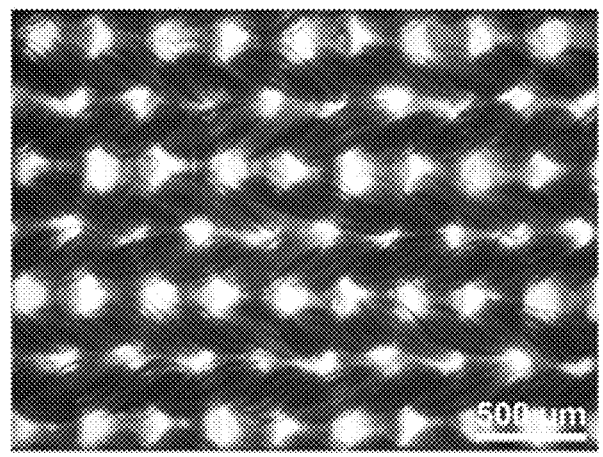
FIGS. 3(a) and 3(b) are a set of transmitted-light microscopy images of a surface and a cross-section of a 3D spacer fabric.

The 3D spacer fabric was observed using a transmitted-light microscope to fundamentally and morphologically understand the triboelectric charge generation in the TENGs. FIG. 3(a) shows the transmitted-light microscopy image of the 3D spacer fabric. The 3D spacer fabric shows very dense micro-gaps between fibers and yarns, implying their 3D spatial distribution.

The 3D distribution of inter-fiber and inter-yarn micro-gaps may affect the momentary motional dynamics of fibers and the consequent spatial density of fiber-to-fiber mechanical interactions under externally applied compression. In particular, fiber surfaces are considered to continually interact with each other throughout the momentary deformation process of the fabric. Accordingly, such micro-gaps result in the generation of very dense triboelectric charges under externally applied compression.

The 3D spacer fabric used in the present invention was a polyester/spandex blend fabric. The elasticity of spandex which enhances the instantaneous motion dynamics of the fibers is considered advantageous for the active generation of triboelectric charges. The compositional heterogeneity of the constituent materials also contributes to triboelectric charging in TENGs.

Figure 3B:
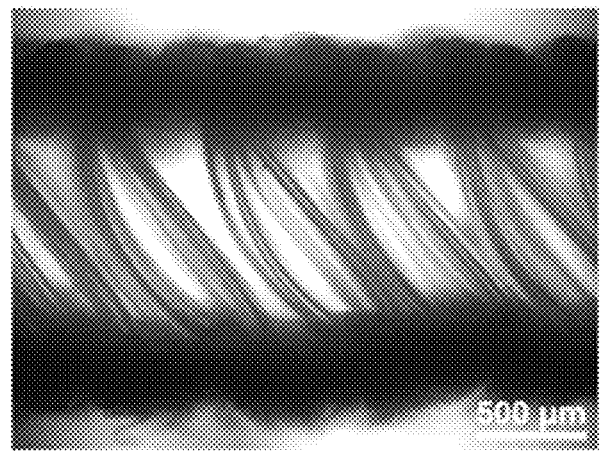

FIG. 3(b) shows the transmitted-light microscopy image for the cross-section of the 3D spacer fabric. Very dense micro-gaps observed between 3D spacer fibers may also lead to the generation of very dense triboelectric charges on their surfaces under externally applied compression. Triboelectric charges may also be generated in the interfaces between 3D spacer fibers and the front and back sheets. In addition, the 3D spacer fibers which act as elastic potential energy repositories are considered to maximize the instantaneous motion dynamics of fibers. It is necessary to note again that the 3D spacer fibers are intertwined with the yarns of the front and back sheets of the fabric.

Figure 4A:
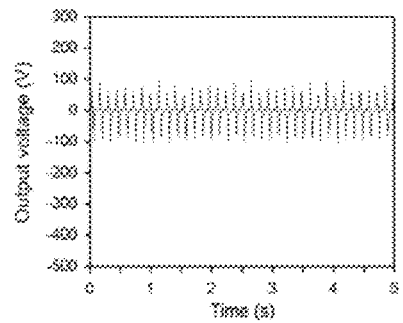
FIGS. 4(a)-4(e) are graphs showing an output voltage ($V_o$) of first to third types of TENGs according to the present invention.
Figure 4B:
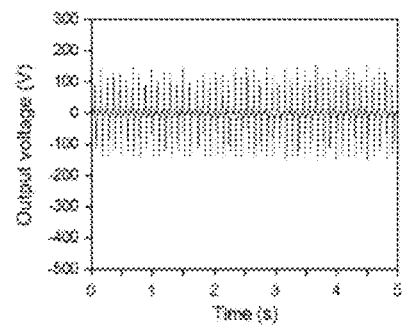
Figure 4C:
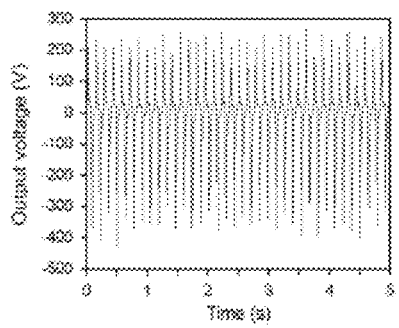

FIGS. 4(a)-4(c) are graphs showing the output voltages $V_o$ of the first to third types of TENGs, respectively.

Figure 4D:
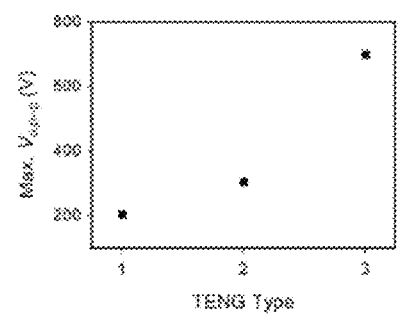
Figure 4E:
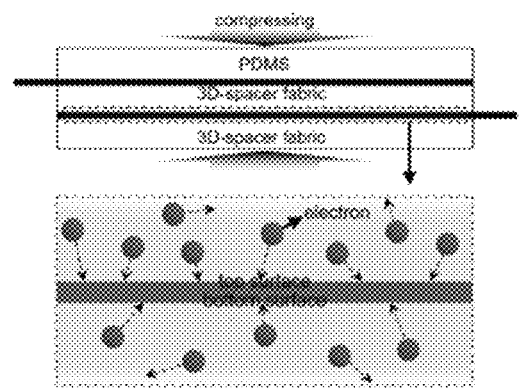

The internal polarity indicated by the measured output voltage $V_o$ of the first type of TENG is possibly due to the previously mentioned morphological asymmetry of the 3D spacer fabric. In contrast, the Type 2 and Type 3 TENGs show higher output voltages $V_o$ than the Type 1 TENG. The higher output voltages $V_o$ of the Type 2 and Type 3 TENGs may be attributed to the relatively high architectural asymmetry of the device configuration. Specifically, as shown in FIG. 4(d), the maximum peak-to-peak output voltages $V_{o,p\text{-}p}$ of the Type 1 to Type 3 TENGs are 205.0, 306.0, and 701.2 V, respectively. Further, the maximum peak-to-peak output voltage $V_{o,p\text{-}p}$ of the Type 3 TENG shows a higher maximum peak-to-peak output voltage $V_{o,p\text{-}p}$ than the Type 2 TENG. Unlike the Type 1 TENG in which the bottom electrode is in contact with a single fabric layer, the bottom electrode of the Type 3 TENG is interposed between the top and bottom fabric layers. This double fabric/electrode junction configuration increases the effective density of the triboelectric charges in the electrode surface as shown in FIG. 4(e). Here, the effective density of triboelectric charges is defined as the sum of the top-surface and bottom-surface densities of the triboelectric charges attracted to the electrode as shown in FIG. 4(b). Accordingly, the highest maximum peak-to-peak output voltage $V_{o,p\text{-}p}$ of the Type 3 TENG among all the types of TENGs may be attributed to the architectural asymmetry of the device configuration and the increased effective density of triboelectric charges. These results represent that the output voltages $V_o$ of the 3D spacer fabric TENGs can be increased notably by modifying the device configuration asymmetry and increasing the effective density of triboelectric charges on electrode surfaces in stack architectures.

In the present invention, three different types of TENGs with polyester/spandex blend 3D spacer fabrics were fabricated by varying the configuration of the constituent layers, and output voltages $V_o$ were compared. The 3D spacer fabrics showed not only uneven and bumpy fiber surfaces in the SEM images but also numerous intertwined yarns and fibers. In addition, very dense inter-fiber and inter-yarn micro-gaps were observed using a transmitted-light microscope to better understand the triboelectric charge generation in the TENGs. Most importantly, the TENGs with PDMS/fabric/PDMS, PDMS/PDMS/fabric, and PDMS/fabric/fabric configurations showed the maximum peak-to-peak output voltages $V_{o,p-p}$ of 205.0, 306.0, and 701.2 V, respectively. The PDMS layer was an insulator in the TENGs and employed to realize the architectural asymmetry and unbalanced charge distribution between the electrodes. The highest maximum peak-to-peak output voltage $V_{o,p-p}$ of the PDMS/fabric/fabric TENG was attributed to the architectural asymmetry of the device configuration and an effective increase in triboelectric charge density. According to the present invention, it is possible to improve and optimize the performance of wearable fabric-based TENGs.

A fabric-based TENG fabricated according to the present invention shows a higher output voltage than fabric-based TENGs according to the related art.

The above exemplary embodiments of the present invention have been disclosed for the purpose of illustration, and those skilled in the art can make various modifications, alterations, and additions within the spirit and scope of the present invention. Such modifications, alterations, and additions should be considered to fall within the scope of the claims.

Since those skilled in the technical field to which the present invention pertains can make various substitutions, modifications, and alterations without departing from the technical spirit of the present invention, the present invention is not limited by the above-described embodiments and the accompanying drawings.

What is claimed is:

1. A triboelectric nanogenerator (TENG) comprising:
a bottom three-dimensional (3D) spacer fabric obtained by combining a front sheet and a back sheet with a 3D spacer inserted between the front sheet and the back sheet;
a top 3D spacer fabric which is stacked on the bottom 3D spacer fabric and obtained by combining a front sheet and a back sheet with a 3D spacer inserted between the front sheet and the back sheet;
a polydimethylsiloxane (PDMS) layer stacked on the top 3D spacer fabric and formed of PDMS;
a bottom electrode inserted between the top 3D spacer fabric and the bottom 3D spacer fabric; and
a top electrode inserted between the top 3D spacer fabric and the PDMS layer.

2. The TENG of claim 1, wherein each of the front sheet and the back sheet is a single jersey fabric which is a knitted structure with loops.

3. The TENG of claim 1, wherein each of the top 3D spacer fabric and the bottom 3D spacer fabric is a polyester (PE)/spandex (SP) blend 3D spacer fabric.

* * * * *